US007836059B2

(12) United States Patent
Forman et al.

(10) Patent No.: US 7,836,059 B2
(45) Date of Patent: Nov. 16, 2010

(54) SYSTEM AND METHOD FOR MINIMALLY PREDICTIVE FEATURE IDENTIFICATION

(75) Inventors: George H. Forman, Port Orchard, WA (US); Henri Jacques Suermondt, Sunnyvale, CA (US); James R. Stinger, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1353 days.

(21) Appl. No.: 10/974,278

(22) Filed: Oct. 26, 2004

(65) Prior Publication Data

US 2006/0101014 A1    May 11, 2006

(51) Int. Cl.
G06F 7/00      (2006.01)
G06F 17/30     (2006.01)

(52) U.S. Cl. .................. 707/749; 715/234; 715/243
(58) Field of Classification Search .................. None
See application file for complete search history.

(56) References Cited

U.S. PATENT DOCUMENTS

| | | | | |
|---|---|---|---|---|
| 5,465,353 A | * | 11/1995 | Hull et al. | 707/5 |
| 5,999,664 A | * | 12/1999 | Mahoney et al. | 382/305 |
| 6,519,586 B2 | * | 2/2003 | Anick et al. | 707/3 |
| 6,654,735 B1 | * | 11/2003 | Eichstaedt et al. | 707/3 |
| 6,665,661 B1 | * | 12/2003 | Crow et al. | 707/3 |
| 2005/0262039 A1 | * | 11/2005 | Kreulen et al. | 707/1 |

OTHER PUBLICATIONS

Hong et al., "Advances in Predictive Model Generation for Data Mining", 1999, IBM Research Report, RC-21570, pp. 1-18.*

* cited by examiner

Primary Examiner—Sathyanarayan Pannala
(74) Attorney, Agent, or Firm—Lloyd E Dakin

(57) ABSTRACT

A system or method for minimally predictive feature identification is disclosed. For information management, an information collection including a set of features is received. A set of prediction values indicating a degree to which a first feature within the set of features predicts other features in the set is generated. The first feature as a minimally predictive feature is identified if each of the prediction values is within a predetermined range of threshold values.

24 Claims, 9 Drawing Sheets

Figure 2:
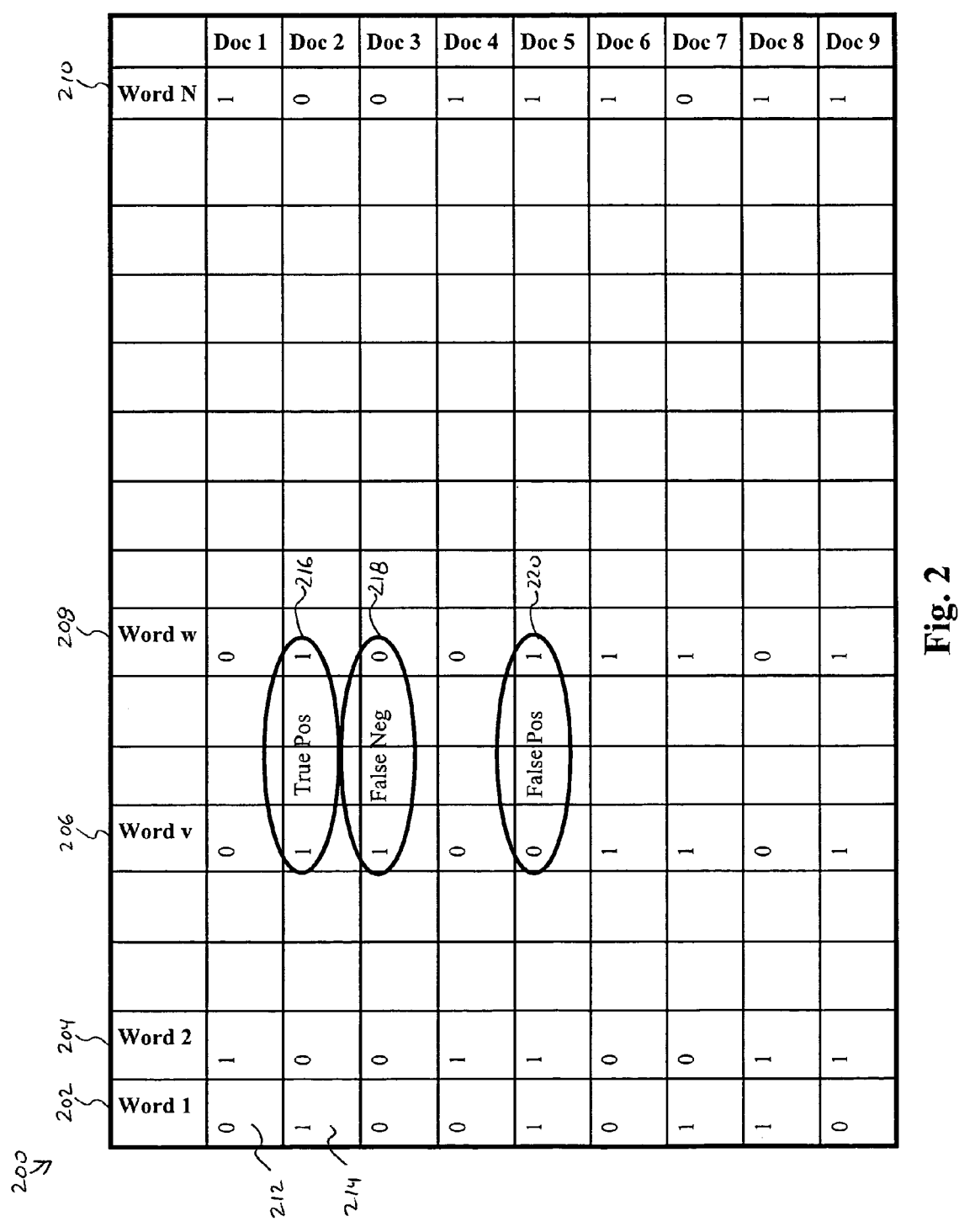

|     | Doc 1 | Doc 2 | Doc 3 | Doc 4 | Doc 5 | Doc 6 | Doc 7 | Doc 8 | Doc 9 |
|-----|-------|-------|-------|-------|-------|-------|-------|-------|-------|
| Word N | 1 | 0 | 0 | 1 | 1 | 1 | 0 | 1 | 1 |
| | | | | | | | | | |
| | | | | | | | | | |
| | | | | | | | | | |
| | | | | | | | | | |
| | | | | | | | | | |
| | | | | | | | | | |
| Word w | 0 | 1 (True Pos) | 0 (False Neg) | 0 | 1 (False Pos) | 1 | 1 | 0 | 1 |
| | | | | | | | | | |
| Word v | 0 | 1 | 1 | 0 | 0 | 1 | 1 | 0 | 1 |
| | | | | | | | | | |
| Word 2 | 1 | 0 | 0 | 1 | 1 | 0 | 0 | 1 | 1 |
| Word 1 | 0 | 1 | 0 | 0 | 1 | 0 | 1 | 1 | 0 |

| | A | B | C | D | E | F | G | H | I | J | K | L | M | N | O | P | |
|---|---|---|---|---|---|---|---|---|---|---|---|---|---|---|---|---|---|
| | 99 | . | . | . | . | . | . | . | . | . | . | . | . | . | . | . | A. product |
| | 99 | 99 | . | . | . | . | . | . | . | . | . | . | . | . | . | . | B. not |
| | . | 99 | 99 | . | . | . | . | . | . | . | . | . | . | . | . | . | C. to |
| | . | . | 99 | 99 | . | . | . | . | . | . | . | . | . | . | . | . | D. model A |
| | . | . | . | . | 99 | . | . | . | . | . | . | . | . | . | -23 | . | E. sync |
| | . | . | . | -34 | . | -33 | -33 | . | . | . | . | . | . | . | . | . | F. model B |
| | . | . | . | -34 | . | 99 | -32 | . | . | . | . | . | . | . | . | . | G. model C |
| | . | . | . | . | . | . | -33 | 99 | . | . | . | . | . | . | . | . | H. the |
| | . | . | . | . | . | . | . | . | . | . | . | . | . | . | . | . | I. battery |
| | . | . | 13-13 | -21 | -21 | . | . | . | -13 | . | 30 | 20 | . | . | -14 | 15 | J. unit |
| | . | . | . | . | . | . | . | . | . | . | -12 | -13 | . | . | . | . | K. will |
| | . | . | 36-13 | . | . | . | . | . | . | 99 12 | . | . | 29 | . | . | . | L. on |
| | . | . | . | -12 | -12 | . | . | . | -21 | 12 99 | . | . | . | . | . | . | M. charge |
| | . | . | . | -17 | . | . | . | . | . | . | . | . | -16 | . | . | . | N. is |
| | . | . | . | . | . | . | . | . | . | . | . | . | . | . | . | . | O. screen |
| | . | . | 24-14 | -24 | . | . | . | . | 30 | 14 | 14 | . | . | -14 | -14 | 22 | P. a |
| | . | . | . | -12 | . | . | . | . | . | . | -12 | . | 99 | 99 | 99 | . | |
| | . | . | . | . | . | . | . | . | -15 | . | . | . | -15 | . | 99 | . | |
| | . | . | . | . | . | . | . | . | 17 | . | . | . | 24 | . | . | 99 | |

Fig. 3

|   | A | B | C | D | E | F | G | H | I | J | K | L | M | N | O | P |
|---|---|---|---|---|---|---|---|---|---|---|---|---|---|---|---|---|
| A. product A | 99 | 99 | . | . | . | . | . | . | . | . | . | . | . | . | . | . |
| B. not | 99 | . | 99 | . | . | . | . | . | -13 | . | 30 | 20 | . | . | . | . |
| C. to | . | . | . | 99 | -33 | -33 | . | . | . | . | -12 | -13 | . | . | . | . |
| D. model A | . | . | . | . | 99 | . | . | . | . | . | . | . | . | . | . | . |
| E. sync | -34 | -17 | . | . | . | 99 | -32 | . | -21 | . | . | -16 | . | . | -23 | . |
| F. model B | -34 | . | . | . | . | . | . | . | . | . | . | . | . | . | . | . |
| G. model C | . | . | . | . | . | . | -33 | 99 | . | . | . | . | . | . | . | . |
| H. the | -13 | -21 | . | . | . | . | . | . | 99 | . | . | 29 | . | -14 | 15 | . |
| I. battery | 36 | -13 | -12 | . | . | . | . | . | . | 99 | 12 | . | . | . | . | . |
| J. unit | . | . | . | . | . | . | . | . | . | 99 | . | . | . | . | . | . |
| K. will | 24 | -14 | -17 | . | . | . | . | . | 30 | 12 | 99 | 14 | 99 | -14 | 22 | . |
| L. on | . | . | . | . | . | . | . | . | . | 14 | . | . | . | . | . | . |
| M. charge | . | -24 | . | . | . | . | . | . | -15 | . | -12 | . | 99 | 99 | . | . |
| N. is | . | . | . | . | . | . | . | . | . | . | . | -15 | . | 99 | . | . |
| O. screen | . | -12 | . | . | . | . | . | . | 17 | . | . | 24 | . | . | 99 | . |
| P. a | . | . | . | . | . | . | . | . | . | . | . | . | . | . | . | . |

Fig. 4

|   | A | B | C | D | E | F | G | H | I | J | K | L | M | N | O | P |
|---|---|---|---|---|---|---|---|---|---|---|---|---|---|---|---|---|
| A. product A | 99 | . | . | . | . | . | . | . | . | . | . | . | . | . | . | . |
| B. not | . | 99 | . | . | . | . | . | . | . | . | 30 | 20 | . | . | . | . |
| C. to | . | . | 99 | . | . | . | . | . | -13 | . | -12 | -13 | . | . | . | . |
| D. model A | . | . | . | 99 | -33 | -33 | . | . | . | . | . | . | . | . | . | . |
| E. sync | . | . | . | . | 99 | -32 | . | -21 | . | . | . | -16 | . | . | . | -23 |
| F. model B | . | . | . | . | . | 99 | . | . | . | . | . | . | . | . | . | . |
| G. model C | . | . | . | . | . | . | 99 | . | . | . | . | . | . | . | . | . |
| H. the | . | . | . | . | . | . | . | 99 | . | . | . | . | . | . | . | . |
| I. battery | . | . | . | . | . | . | . | . | 99 | . | . | . | 29 | . | -14 | 15 |
| J. unit | . | . | . | . | . | . | . | . | . | 99 | 12 | . | . | . | . | . |
| K. will | . | . | . | . | . | . | . | . | . | . | 99 | . | 14-12 | . | -14 | 22 |
| L. on | . | . | . | . | . | . | . | . | . | . | . | 99 | . | . | . | . |
| M. charge | . | . | . | . | . | . | . | . | . | . | . | . | 99 | . | . | . |
| N. is | . | . | . | . | . | . | . | . | . | . | . | . | . | 99 | . | . |
| O. screen | . | . | . | . | . | . | . | . | . | . | . | . | . | . | 99 | . |
| P. a | . | . | . | . | . | . | . | . | . | . | . | . | . | . | . | 99 |

|   | A | B | C | D | E | F | G | H | I | J | K | L | M | N | O | P |   |
|---|---|---|---|---|---|---|---|---|---|---|---|---|---|---|---|---|---|
| A | 99 | . | . | . | . | . | . | . | . | . | . | . | . | . | . | . | A. product A |
| B | . | 99 | . | . | . | . | . | . | . | . | . | . | . | . | . | . | B. not |
| C | . | . | 99 | . | . | . | . | . | . | . | . | . | . | . | . | . | C. to |
| D | . | . | . | 99 | . | . | . | . | . | . | . | . | . | . | . | . | D. model A |
| E | . | . | . | . | 99 | . | . | . | . | . | . | . | . | . | . | . | E. sync |
| F | . | . | . | . | . | 99 | . | . | . | . | . | . | . | . | . | . | F. model B |
| G | -34 | . | . | . | . | . | 99 | . | . | . | . | . | . | . | . | . | G. model C |
| H | -34 | . | . | -33 | . | . | . | 99 | . | . | . | . | . | . | . | . | H. the ~606 |
| I | 13 | -13 | . | -21 | . | . | . | . | 99 | . | . | . | . | . | . | . | I. battery |
| J | 36 | -13 | . | -12 | . | . | . | . | . | 99 | . | . | . | . | . | . | J. unit |
| K | 24 | -14 | . | -17 | . | . | . | . | 30 | . | 99 | . | . | . | . | . | K. will |
| L | . | . | . | . | . | . | . | . | 14 | 12 | . | 99 | . | . | . | . | L. on |
| M | . | . | . | . | . | . | . | . | -12 | -12 | . | . | 99 | . | . | . | M. charge |
| N | . | . | . | . | . | . | . | . | -15 | -15 | . | . | . | 99 | . | . | N. is |
| O | . | . | . | . | . | . | . | . | 17 | 24 | . | . | . | . | 99 | . | O. screen |
| P | . | . | . | . | . | . | . | . | . | . | . | . | . | . | . | 99 | P. a |

604 (row A highlighted); 608 (column H highlighted); 610 (row I highlighted); 602 (label column); 606 (H. the)

SYSTEM AND METHOD FOR MINIMALLY PREDICTIVE FEATURE IDENTIFICATION

CROSS-REFERENCE TO RELATED OR CO-PENDING APPLICATIONS

This application relates to U.S. patent application Ser. No. 10/902,924, entitled "System And Method For Category Discovery," filed on Jul. 30, 2004, now U.S. Pat. No. 7,325,005, issued Jan. 29, 2008.

BACKGROUND OF THE INVENTION

1. Field of the Invention

The present invention relates generally to systems and methods for information management, and more particularly to minimally predictive feature identification.

2. Discussion of Background Art

A great deal of work both in research and in practice in the field of information retrieval and machine learning for text classification begins by eliminating stopwords. Stopwords are typically words within a document which, depending upon an application, are of minimal use when effecting the application. Such stopwords are preferably removed from consideration by a human editor in whose judgment these words will not be of use during some predetermined information processing task.

In one application stopwords could be common words such as: "a", "the", "and", and the like. For example, when a web search engine indexes web pages, it typically does not build reverse indices for words such as "a", "the" and "of".

Other applications include programs which attempt to analyze and categorize large document collections (e.g. customer support call logs, text strings, survey data, etc.) detailing a variety of customer issues and solutions provided thereto. Such document collections typically include a great many stopwords which tend to make analysis and categorization of the document collection overly complex and often yields somewhat confusing results and category descriptions. For example, analysis applications which use word counting techniques to generate lists of most frequently occurring words (or capitalized names or noun phrases or whatever) tend not to be very informative since such lists include a large number of stopwords (e.g. "of" and "the") and other useless words unless the list has been manually tailored for the set of documents.

Thus, eliminating stopwords from a document collection before such collection is further processed can greatly reduce an application's use of computational and storage resources without significantly affecting the results.

Some current approaches for eliminating stopwords include:

1) Manual Editing: Stopword lists have traditionally been constructed manually based on an individual's judgment on which words in a document collection are not important in the context of a particular information processing application.;

2) Use of pre-existing stopword lists: Because stopword lists require such an effort to construct, users (especially researchers) often re-use existing lists of words from other projects and public lists. A significant problem with such an approach, however, is that stopword lists are known to be dependent on the document collection at hand. For example, in one application "can" might be considered a stopword (i.e. "I can see.") However, in another application for glass and can recycling, "can" would tend not to be a stopword, and eliminating it would be devastating to a classifier tasked with the problem of separating documents about the two types of recycling. Similarly, stopwords are often dependent upon the document collection's language. For instance, documents written in German necessarily require a different stopword list from those written in French.;

3) Popular words as stopwords: In this approach, a computer counts the frequency of various words within a document collection and defines the most frequent word as stopwords. One disadvantage of such an approach is that many frequently occurring words are indeed useful for discriminating and managing documents. For example, in a collection of tech support documents that is 95% from Company-A and 5% from Company-B, the word "Company-A" might appear to be a stopword; however, people who are searching the document collection may wish to specifically identify or exclude documents from "Company-A"; and 4) Feature selection for identifying stopwords: Attempts to apply feature selection techniques in the field of machine learning to focus on the predictive words fall short since current feature selection techniques do not work unless the words in a document collection have already been organized into pre-defined categories (i.e. labeled). Even then, any predictive effect is limited to whether any given set of words is more or less predictive for a given predefined category or label, and not as to the document collection as a whole. In typical settings, no categories or labels are provided, and therefore current feature selection techniques cannot be applied to determine stopwords.

In response to the concerns discussed above, what is needed is a system and method for stopword identification that overcomes the problems of the prior art.

SUMMARY OF THE INVENTION

The present invention is a system or method for minimally predictive feature identification. For information management, an information collection including a set of features is received. A set of prediction values indicating a degree to which a first feature within the set of features predicts other features in the set is generated. The first feature as a minimally predictive feature is identified if each of the prediction values is within a predetermined range of threshold values.

These and other aspects of the invention will be recognized by those skilled in the art upon review of the detailed description, drawings, and claims set forth below.

BRIEF DESCRIPTION OF THE DRAWINGS

FIG. 2 is one embodiment of a bit vector matrix within the system;

FIG. 3 is one embodiment of a word prediction matrix within the system;

FIG. 4 is one example of a set of stopwords within a complete word prediction matrix;

FIG. 5 is one example of a set of stopwords within a first partial word prediction matrix;

FIG. 6 is one example of a set of stopwords within a second partial word prediction matrix;

DETAILED DESCRIPTION OF THE PREFERRED EMBODIMENT

The present invention is a system and method which identifies minimally predictive feature sets, such as stopwords, within an information collection. Features, in the field of machine learning classification, are defined as a "potential measurement that may be applied uniformly to all cases" (see "Predictive Data Mining, A Practical Guide" by Shalom M. Weiss and Nitin Indurkhya, 1998). For example, if the present invention is applied toward classifying text or documents, then one feature may be a bit indicating whether a particular word (e.g. "free") or a phrase (e.g. "free money") is present in the document, or a number indicating the number of times the word occurs in the document. If the present invention is applied to classifying hospital patients, then one feature may be a number indicating their blood pressure. In bio-computing or bio-informatic applications, one feature may be a bit indicating whether a particular yeast gene is present in a tissue sample. Features are herein also defined to include "string sets", such as one or more words, terms, numbers, symbols, or combinations thereof found within the information collection. The information collection may include any set of information, including help desk call logs, survey data, genomic data, published papers, documents, books, web pages, chat logs, blogs, network connection links, and so on. The present invention can also be applied to any kind of Boolean feature.

Methods according to some embodiments can be performed by application instructions on a computer-readable medium, where the instructions when executed by a computer perform corresponding tasks.

The present invention describes systems and methods for identifying and, if desired, eliminating feature sets which are minimally predictive of other feature sets in an information collection, thereby simplifying processing of the information collection by other application programs, such as category discovery programs or known manner clustering methods. For example, the present invention can be included in a set of tools that automatically analyzes help desk logs and identifies common categories of problems. The present invention can eliminate various stopwords from the logs and thereby improve categorization of various help desk problems and solutions. The present invention also improves upon current manual techniques for eliminating minimally predictive terms (e.g. stopwords) from information collections and generates unique stopword lists for each information collection processed.

While the present invention is primarily described below with reference to identifying and eliminating "stopwords" from a "document collection", those skilled in the art will recognize that the invention more generally applies toward identifying and eliminating minimally predictive feature sets from any information collection.

Figure 1:
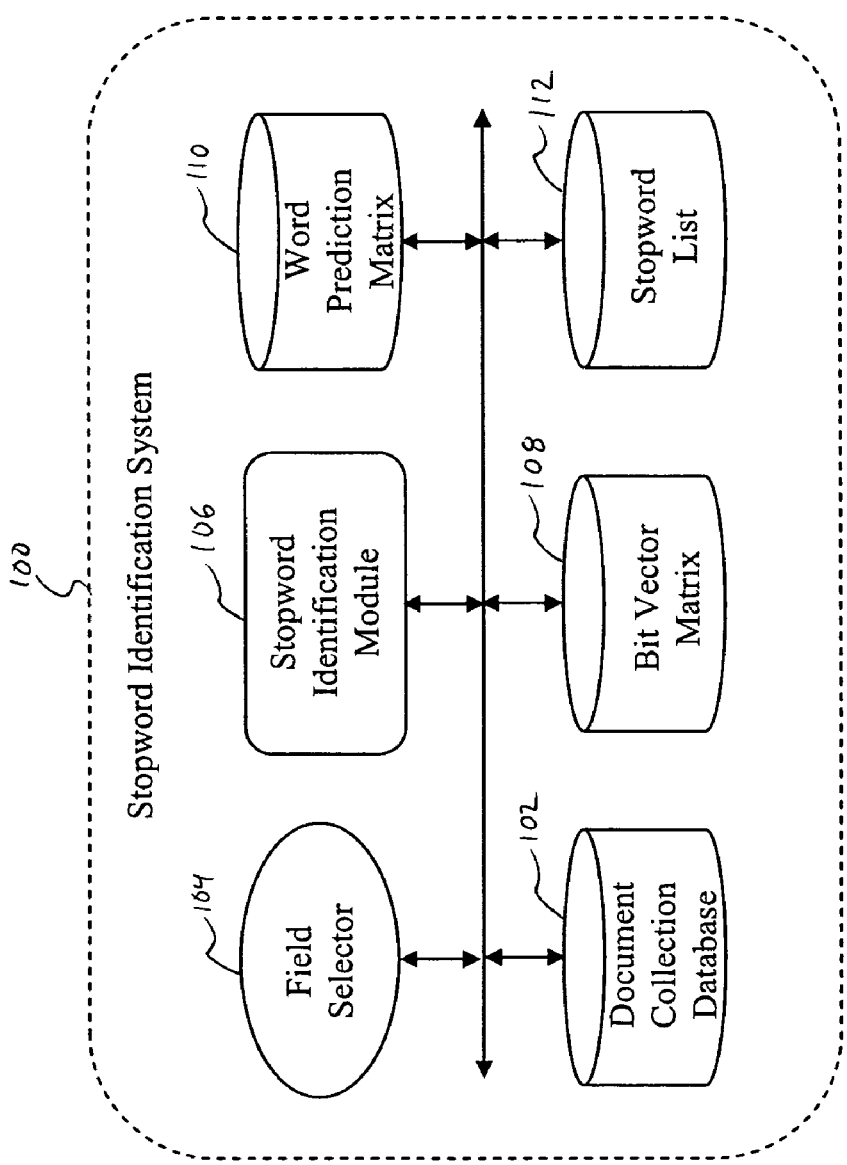
FIG. 1 is a dataflow diagram of one embodiment of a system for minimally predictive feature identification.

FIG. 1 is a dataflow diagram of one embodiment of a system 100 for minimally predictive feature identification. To begin, the system 100 identifies a document collection within a document collection database 102. Which document collection the system 100 identifies can be pre-programmed by a system administrator, or selected by a user. Alternatively, the document collection can be transmitted directly to the system 100 over a network. In this latter case the system 100 can form the basis of a web service provided to customers on-line.

Each document within the collection preferably includes a set of fields which the system 100 can analyze for stopwords. These fields may include: a title field; a name field; a description field; a dialog field; and so on. A field selector 104 selects one or more fields within the document collection to be analyzed for stopwords. The field selector 104 can be a user, such as a librarian, analyst, or other person, or the field selector 104 can be a device which computes which field(s) to analyze for stopwords based on other factors, such as the type of data present in the field (e.g. date, dollar amount, or text field).

A stopword identification module 106 calculates a frequency of occurrence for each word within the document collection. The stopword identification module 106 generates a most frequent word list (L) containing the most frequently occurring words within the document collection. The list is sorted by each word's frequency of occurrence. If, however, a word's frequency of occurrence is above a predetermined frequency and the word is a priori known to be a potential stopword (e.g. common words as 'a', 'an' and 'the', or their equivalents in the language of the document collection), then the stopword identification module 106 defines the word as a stopword and places the word in a stopword list 112. The stopword identification module 106 eliminates the word from the most frequent word list as well so that additional stopwords that are not as obvious or common can be discovered more quickly by the present invention.

Preferably the size (N) of the most frequent word list is about 50 to 100 words, since empirical testing data indicates that a substantially smaller list can exclude many important words, while a substantially larger most frequent word list often includes many spurious or weak words, which increase the system's 100 computational complexity without proportionately improving upon the system's 100 categorization results. Those skilled in the art however will recognize that the most frequent word list can be of any size and that different size lists may be preferred based on different applications of the present invention, differing document collections, and differing fields to be analyzed for stopwords.

The stopword identification module 106 builds a bit vector matrix 108 for the word list. For each word in the most frequent word list, a word bit vector, of length equal to the number of documents in the document collection, is generated by the stopword identification module 106. A "1" is assigned to each position in the word bit vector corresponding to those documents that contain the word, and a "0" is assigned to each position in the word bit vector corresponding to those documents that do not contain the word. Those skilled in the art will recognize that labels other than "1" or "0" may be used as well in the bit vectors.

FIG. 2 is one embodiment 200 of the bit vector matrix 108 within the system 100. Each column in the matrix 108 is a word bit vector (e.g. "Word 1" 202, "Word 2" 204, "Word v" 206, "Word w" 208, through "Word N" 210). Each row in the matrix 108 corresponds to a document (e.g. Doc 1 through Doc 9) in the document collection. In this embodiment 200, "Word 1" 202 is not in Doc 1, so a "0" is entered at entry 212 in the matrix 108. Whereas, "Word 1" 202 is in Doc 2, so a "1" is entered at entry 214 in the bit vector matrix 108. In an alternate embodiment, the stopword identification module 106 can also generate a reverse index for each word by listing those documents that contain the word.

Next, for each pair of word bit vectors (e.g. "Word v" 206 and "Word w" 208) the stopword identification module 106 defines "All_Positives" as the number of rows in which the first word bit vector in the pair (e.g. "Word v" 206) has a first label, preferably "1", (i.e. All_Positives=count(word bit vector v), wherein "count( )" is a subroutine that returns the number of "1's" in the word bit vector v 206).

For each pair of word bit vectors (e.g. "Word v" 206 and "Word w" 208) the stopword identification module 106 defines "All_Negatives" as a number of rows in which the first word bit vector in the pair (e.g. "Word v" 206) has a second label, preferably "0", (i.e. All_Negatives=(number of documents in the collection)—All_Positives).

For each pair of word bit vectors (e.g. "Word v" 206 and "Word w" 208) the stopword identification module 106 defines "True_Positives" as a number of rows in the matrix 108 in which both "Word v" and "Word w" have a 1 (e.g. pair 216 in the matrix 108). Mathematically, this calculation is: True_Positives=count(bit vector w<bitwise-and>bit vector v ).

For each pair of word bit vectors (e.g. "Word v" 206 and "Word w" 208) the stopword identification module 106 defines "False_Negatives" as a number of rows in the matrix 108 in which "Word v" 206 has a 1 but "Word w" 208 has a 0 (e.g. pair 218 in the matrix 108). Mathematically, this calculation is: False_Negatives=All_Positives−True_positives.

For each pair of word bit vectors (e.g. "Word v" 206 and "Word w" 208) the stopword identification module 106 defines "False_Positives" as a number of rows in the matrix 108 in which "Word v" 206 has a 0 but "Word w" 208 has a 1 (e.g. pair 220 in the matrix 108). Mathematically, this calculation is: False_Positives=count(word bit vector w)−True_Positives (i.e. False_Positives=All_Negatives−True_Positives).

The stopword identification module 106 then builds a word prediction matrix 110 as will be discussed below. Note that in a more general case of the present invention where "words" are replaced by "features" or "strings", the word prediction matrix 110 is instead labeled either "a feature prediction matrix" or "a string prediction matrix".

The word prediction matrix 110 contains a set of prediction values which indicate how well each of the words in the list predict each other. The prediction values are classified as either "positively predictive", "negatively predictive", or "minimally predictive". "Positively predictive words" are herein defined as words that tend to occur together in the same document collection. "Negatively predictive words" are herein defined as words that do not tend to occur together in the same document collection. "Minimally predictive words" are herein defined as words whose predictive strength within a document collection is relatively miniscule.

The word prediction matrix 110 is preferably a Bi-Normal Separation (BNS) matrix of size N×N, which yields a negative prediction value (i.e. number) if a pair of words are negatively predictive, and a positive prediction value (i.e. number) if a pair of words are positively predictive. Those skilled in the art will know that other (i.e. non-BNS) word prediction matrices may be used as well. Such other matrices may include a correlation metric like "LIFT" that uses numbers from 0.0 to 1.0 to be negative correlation, and >1.0 for positive correlation. These other prediction matrices preferably enable methods for automated differentiation between words that are negatively predictive and words that are positively predictive. Note also that within this specification the phrases "positive pair", "predictive pair", and "positively correlated pair" are preferably functionally equivalent. Similarly, the phrases "negative pair", "negatively predictive pair", and "negatively correlated pair" are preferably functionally equivalent as well.

A raw BNS prediction value calculated for each entry in the matrix 110 is:

F(True_Positives/All_Positives)−F(False_Positives/All_negatives), (wherein F(x) is either an inverse cumulative distribution function or a inverse cumulative distribution function of the Normal curve)

The function F(x) can take on prediction values from negative infinity (for a cumulative value of 0) to positive infinity (for a cumulative value of 1) on a scale where each unit is a standard deviation from the mean. In the preferred embodiment, a look-up table is used to reduce the time required to compute F(x) for each prediction value entry in the matrix 110. In the table F(x) is limited to a range of about −3 to +3 because limiting the range helps reduce computational complexity and prevents overflow values such as infinity.

If visualization of the data is important, the raw BNS prediction values ranging from −3 to +3 can be translated into scaled BNS prediction values ranging from −99 to +99, by multiplying each raw BNS prediction value by a constant scaling factor of approximately 99/3, otherwise scaling is not required. These scaled BNS prediction values are then stored at each respective entry in the matrix 110.

If an absolute value of a scaled prediction value in the matrix 110 is below a predetermined threshold value (i.e. minimally predictive words), then the stopword identification module 106 replaces that scaled prediction value with a "null value" in order to simplify further matrix 110 processing operations. These pairs of minimally predictive words are only weakly predictive of each other.

FIG. 3 is one embodiment 300 of the word prediction matrix 110 within the system 100. In this embodiment 300 the list of words ranges from "A" (corresponding to "Product A") to "P" (corresponding to "a") and thus N=16. This word prediction matrix 300 also includes an exemplary set of scaled BNS prediction values. Note that since each word in the matrix 300 is completely related to itself, the matrix 300 diagonal has a scaled BNS prediction value set to "99" (i.e. the "100" scaled BNS prediction value has been clamped to a two digit 99 value in this example). The negative "−" numbers indicate a negative prediction value and the other unsigned numbers represent a positive prediction value. The dot entries 302, 304, etc. in the matrix 300 represent the "null values" assigned to those words which have only a weak predictive relationship with respect to another word. For example, word pairs "screen" and "product A" (see matrix entries 302 and 304) are not very predictive of each other and thus are assigned a "null value".

Due to the commonly symmetric nature of word prediction, in an alternate embodiment of the present invention, the stopword identification module 106 builds only half of the word prediction matrix 110. Thus, for example, for each pair of words v and w there must be prediction value in word prediction matrix 110 for either row v and column w or for row w and column v. Such a simplification may be acceptable for some applications. Thus, the word prediction matrix can be built uni-directionally, either below the matrix diagonal or above the diagonal.

If a word's scaled prediction values with respect to each of the other words in the matrix 110 is set equal to the "null value" (i.e. scaled prediction values less than the predetermined threshold), then the stopword identification module 106 identifies that word as a stopword. The stopword identification module 106 adds the identified stopword to the stopword list 112. Stopwords (e.g. minimally predictive words) are only weakly predictive with respect to each of the other words on the most frequent word list within the document collection.

FIG. 4 is one example of a set of stopwords within a complete word prediction matrix 400. In the complete matrix 400, the scaled prediction values for "Product A" 402 have "null values" with respect to each of the other words (i.e. B through P), as shown by row 404 and column 406. Similarly, the scaled prediction values for "the" 408 have "null values" with respect to each of the other words A through G and I through P, as shown by row 410 and column 412. This shows that the words "Product A" 402 and "the" 408 are not substantially predictive of the other most frequently occurring words within this particular document collection. Note that in another document collection, "Product A" 402 and "the" 408 might exceed the predetermined prediction value threshold, in which case the stopword identification module 106 would not identify them as stopwords.

FIG. 5 is one example of a set of stopwords within a first partial word prediction matrix 500. The first partial matrix 500 is derived from the complete matrix 400, since as discussed, in some applications a complete matrix need not be generated and only a partial matrix is required. In the first partial matrix 500, the scaled prediction values for "Product A" 502 have "null values" with respect to each of the other words B through P, as shown by row 504. Similarly, the scaled prediction values for "the" 506 have "null values" with respect to each of the other words A through G, as shown by column 508, and I through P, as shown by row 510. However, in the first partial matrix 500, "on" 512 also has scaled prediction values which have "null values" with respect to each of the other words A through K, as shown by column 514 and M through P, as shown by row 516. Thus while only the words "Product A" 402 and "the" 408 were identified as stopwords using the complete matrix 400, words "Product A" 502, "the" 508, and "on" 512 were identified as stopwords using the first partial matrix 500. Due to such differing results, a user would need to decide whether to use the complete matrix 400 or the first partial matrix 500, for this particular document collection.

FIG. 6 is one example of a set of stopwords within a second partial word prediction matrix 600. The second partial matrix 600 is derived from the complete matrix 400. In the second partial matrix 600, the scaled prediction values for "Product A" 602 have "null values" with respect to each of the other words B through P, as shown by column 604. Similarly, the scaled prediction values for "the" 606 have "null values" with respect to each of the other words A through G, as shown by row 608, and I through P, as shown by column 610. The stopwords "Product A" 602 and "the" 606 identified by the second partial matrix 600 agree with the stopwords "Product A" 402 and "the" 408 identified using the complete matrix 400. Due to these equivalent results, a user might decide to use the second partial matrix 600 instead of the complete matrix 400 or the first partial matrix 500, for this particular document collection.

In an alternate embodiment of the present invention, the stopword identification module 106 only identifies a set of potential stopwords candidates from which a user then selects an actual set of stopwords to place on the stopword list 112.

This alternate embodiment includes having the stopword identification module 106 identify for each word in the most frequent word list a maximum absolute prediction value from the set of prediction values associated with that word with respect to all of the other words on the most frequent word list. For example, in FIG. 4, the words "unit", "on", and "is" have maximum absolute scaled prediction values of "12" with respect to all of the other words within the complete word prediction matrix 400, the word "will" has a maximum absolute scaled prediction values of "36", and so on.

The stopword identification module 106 sorts the most frequently occurring words according to their absolute maximum prediction values. The stopword identification module 106, adds those words whose maximum absolute prediction values are below a predetermined threshold to a potential stopwords candidates list. Then, the stopword identification module 106 transfers a set of words in the potential stopwords candidates list to the stopword list 112 in response to a user selection. In this way, users can use their judgment and the potential stopwords candidates list to more quickly select an appropriate set of stopwords from the most frequently occurring words in a document collection.

While the invention as just described does not require a training set (i.e. assignments of documents into pre-defined categories), if a training set is available for categories of interest (e.g. a set of 20,000 documents divided into 250 categories of interest), then each category could be included as a "pseudo-word" added to the set of features, where the positive set for the category (i.e. pseudo-word) includes all positive training cases for the category. In this way, words (i.e. features within the document collection) that are highly predictive of individual categories (i.e. the pseudo-words) are not discarded as stopwords (i.e. the extended algorithm would not output pseudo-words as stopwords). This same method may be applied even where the set of labels are a product of clustering the dataset (i.e. no human effort may have gone into assigning documents to categories or even identifying categories).

Figure 7:
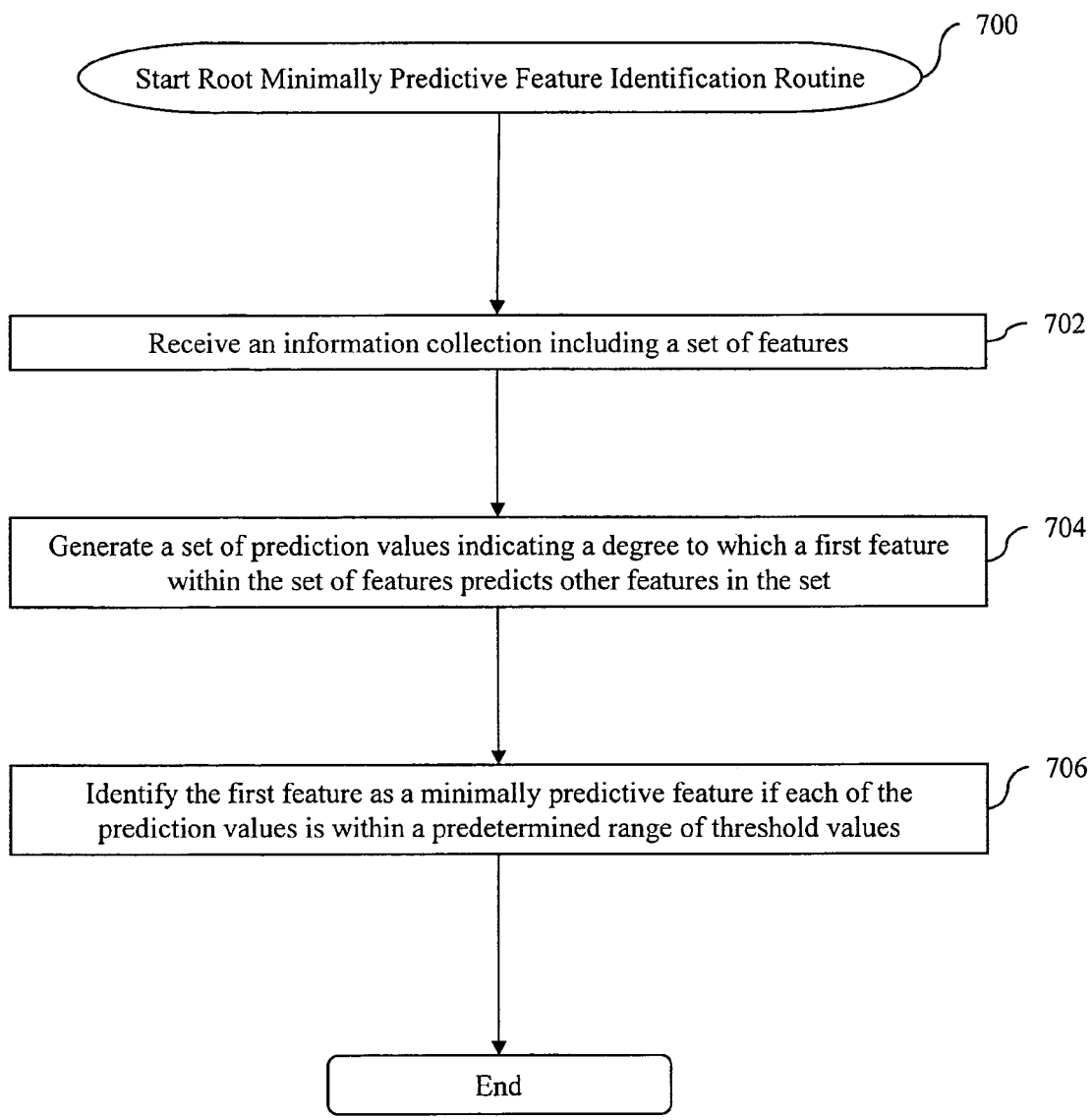
FIG. 7 is a flowchart of one root embodiment of a method for minimally predictive feature identification.

FIG. 7 is a flowchart of one root embodiment of a method 700 for minimally predictive feature identification. In step 702, the stopword identification module 106 receives an information collection including a set of features from the document collection database 102. In step 704, the stopword identification module 106 generates a set of prediction values indicating a degree to which a first feature within the set of features predicts other features in the set. Then in step 706, the stopword identification module 106 identifies the first feature as a minimally predictive feature if each of the prediction values is within a predetermined range of threshold values. The root method 700 is discussed in further detail with respect to FIG. 8.

Figure 8A:
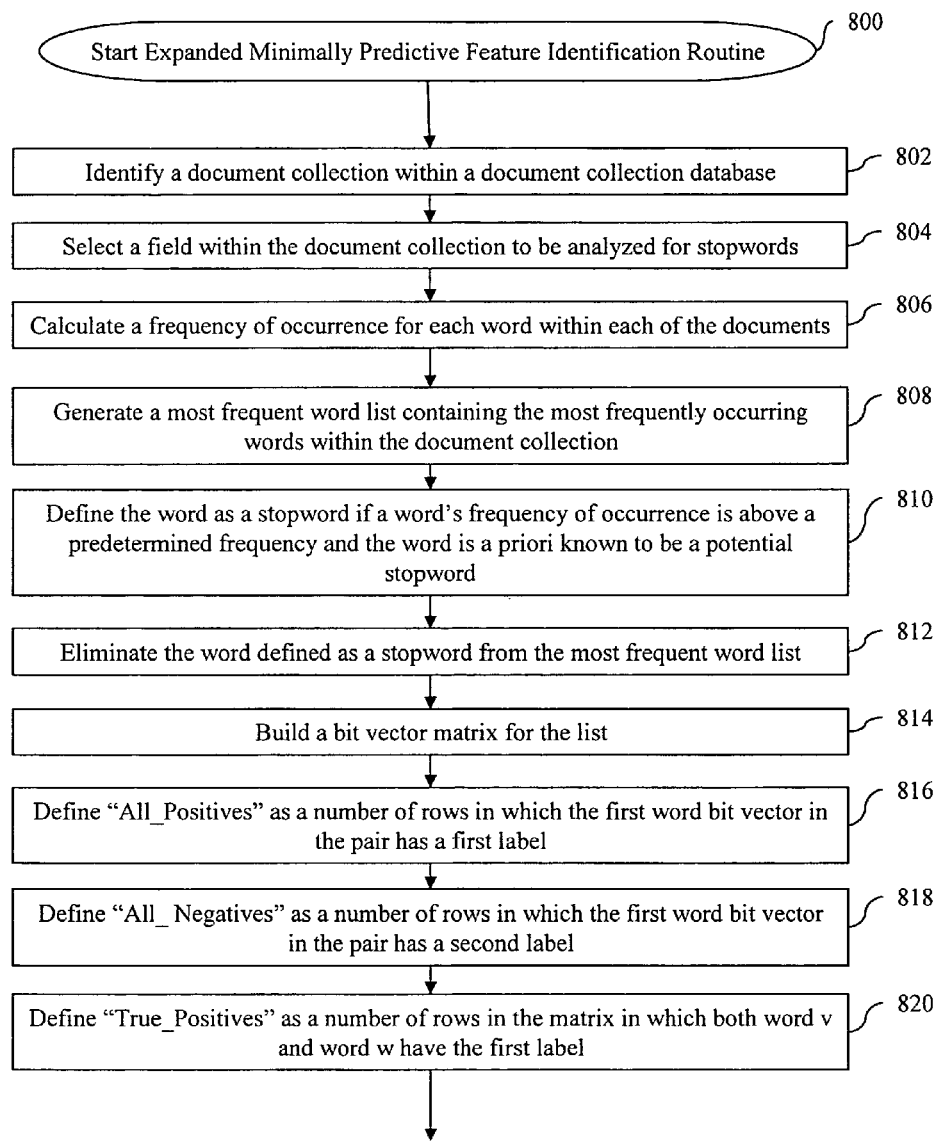
FIG. 8 is a flowchart of one expanded embodiment of the root method for minimally predictive feature identification.
Figure 8B:
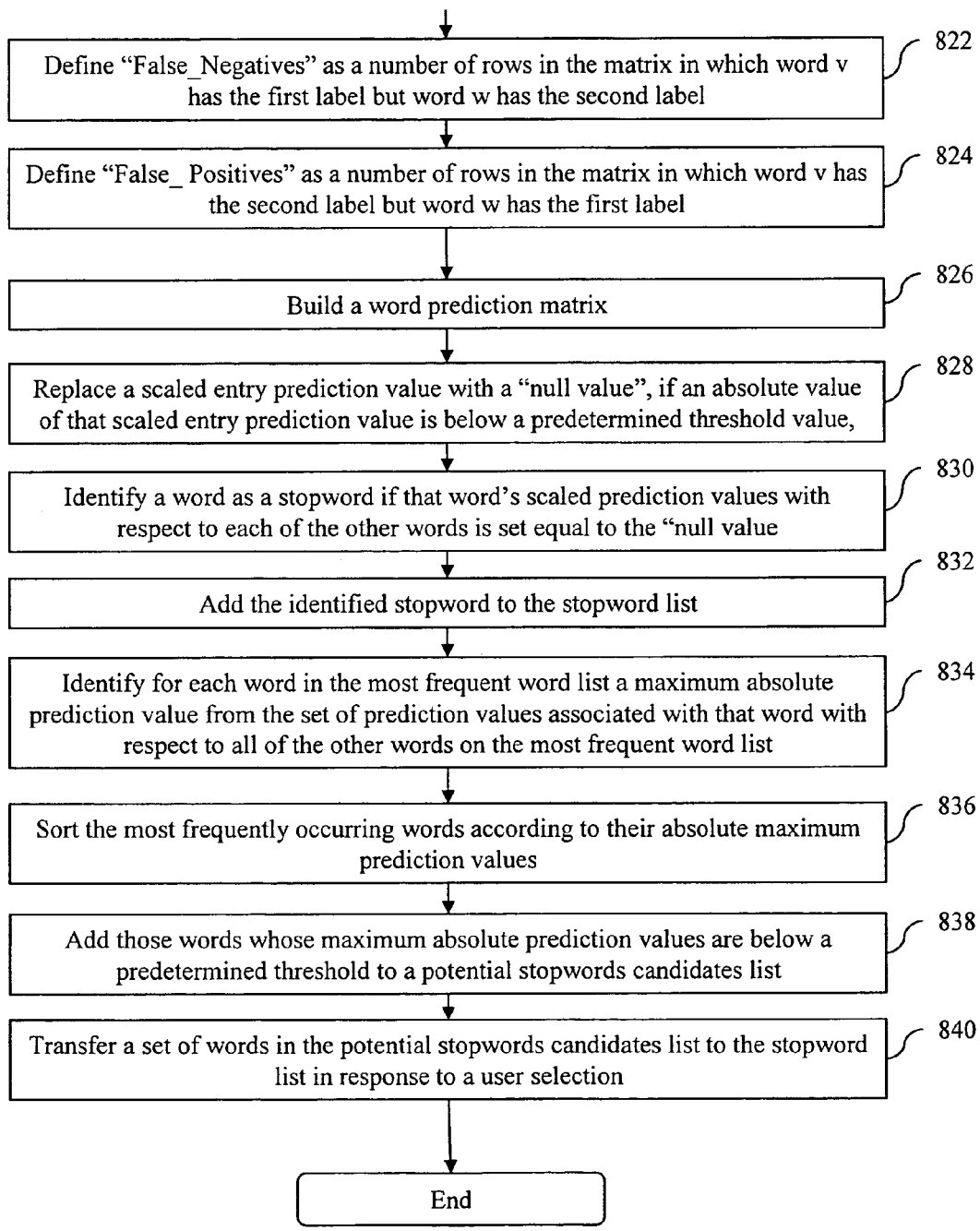

FIG. 8 is a flowchart of one expanded embodiment 800 of the root method for minimally predictive feature identification. To begin, in step 802, the system 100 identifies a document collection within a document collection database 102. In step 804, a field selector 104 selects a field within the document collection to be analyzed for stopwords.

In step 806, a stopword identification module 106 calculates a frequency of occurrence for each word within each of the documents. In step 808, the stopword identification module 106 generates a most frequent word list (L) containing the most frequently occurring words within the document collection. In step 810, if, however, a word's frequency of occurrence is above a predetermined frequency and the word is a priori known to be a potential stopword, then the stopword identification module 106 defines the word as a stopword and places the word in a stopword list 112. In step 812, the stopword identification module 106 eliminates the word from the most frequent word list as well so that additional stopwords that are not as obvious or common can be discovered more quickly by the present invention.

In step 814, the stopword identification module 106 builds a bit vector matrix 108 for the list. Next, in step 816, for each pair of word bit vectors the stopword identification module 106 defines "All_Positives" as a number of rows in which the first word bit vector in the pair has a first label. In step 818, for each pair of word bit vectors the stopword identification module 106 defines "All_Negatives" as a number of rows in which the first word bit vector in the pair has a second label. In step 820, for each pair of word bit vectors the stopword identification module 106 defines "True_Positives" as a number of rows in the matrix 108 in which both "Word v" and "Word w" have the first label. In step 822, for each pair of word bit vectors the stopword identification module 106 defines "False_Negatives" as a number of rows in the matrix 108 in which "Word v" 206 has the first label but "Word w" 208 has the second label. In step 824, for each pair of word bit vectors the stopword identification module 106 defines "False_Positives" as a number of rows in the matrix 108 in which "Word v" 206 has the second label but "Word w" 208 has the first label.

In step 826, the stopword identification module 106 then builds a word prediction matrix 110. In step 828, if an absolute value of a scaled prediction value in the matrix 110 is below a predetermined threshold value, then the stopword identification module 106 replaces that scaled prediction value with a "null value" in order to simplify further matrix 110 processing operations. In step 830, if a word's scaled prediction values with respect to each of the other words in the matrix 110 is set equal to the "null value, then the stopword identification module 106 identifies that word as a stopword. In step 832, the stopword identification module 106 adds the identified stopword to the stopword list 112.

In an alternate embodiment of the present invention, the stopword identification module 106 only identifies a set of potential stopwords candidates from which a user then selects an actual set of stopwords to place on the stopword list 112.

This alternate embodiment includes, in step 834, having the stopword identification module 106 identify for each word in the most frequent word list a maximum absolute prediction value from the set of prediction values associated with that word with respect to all of the other words on the most frequent word list.

In step 836, the stopword identification module 106 sorts the most frequently occurring words according to their absolute maximum prediction values. In step 838, the stopword identification module 106, adds those words whose maximum absolute prediction values are below a predetermined threshold to a potential stopwords candidates list. Then in step 840, the stopword identification module 106 transfers a set of words in the potential stopwords candidates list to the stopword list 112 in response to a user selection.

While one or more embodiments of the present invention have been described, those skilled in the art will recognize that various modifications may be made. Variations upon and modifications to these embodiments are provided by the present invention, which is limited only by the following claims.

What is claimed is:

1. A computer-implemented method for information management, comprising:
   receiving, by a computer, an information collection including a set of features;
   generating, by the computer, a set of prediction values indicating a degree to which a first feature within the set of features predicts other features in the set;
   identifying, by the computer, the first feature as a minimally predictive feature if each of the prediction values is within a predetermined range of threshold values;
   wherein identifying the first feature as the minimally predictive feature enables elimination of the first feature from use during classification of information,
   wherein the generating includes:
      generating a feature vector for each of individual features in the set of features;
      using values in each feature vector to indicate a degree to which information sets within the information collection contain the respective feature; and using the feature vectors to compute the set of prediction values.

2. The method of claim 1:
   wherein identifying includes identifying the first feature as a minimally predictive feature if an absolute value of each of the prediction values is below a predetermined threshold value.

3. The method of claim 1, wherein:
   the set of features include words; and
   the minimally predictive feature is a stopword, wherein the first feature is identified as the stopword if each of the predictive values is within the predetermined range of threshold values.

4. The method of claim 1, wherein:
   the information collection is organized into a set of categories having category labels; and
   the set of features include the category labels.

5. The method of claim 1, further comprising:
   enumerating a set of most frequently occurring features within the information collection; and
   performing the generating and identifying only with respect to the set of most frequently occurring features.

6. The method of claim 1:
   wherein generating the set of prediction values includes generating Bi-Normal Separation matrix prediction values.

7. The method of claim 1, further comprising:
   classifying the first feature as a positively predictive feature with respect to another feature if the respective prediction value is positive and an absolute value of the respective prediction value is above a predetermined threshold value.

8. The method of claim 1, further comprising:
   classifying the first feature as a negatively predictive feature with respect to another feature if the respective prediction value is negative and an absolute value of the respective prediction value is above a predetermined threshold value.

9. The method of claim 1:
   wherein generating includes generating a positive prediction value if a pair of features within the set of features tend to occur together in the information collection.

10. The method of claim 1:
    wherein the generating includes generating a negative prediction value if a pair of features within the set of features tend not to occur together in the information collection.

11. The method of claim 1:
    wherein the information collection includes a center call log.

12. A computer-implemented method for information management, comprising:
    receiving, by a computer, an information collection including a set of features;
    generating, by the computer, a set of prediction values indicating a degree to which a first feature within the set of features predicts other features in the set;
    identifying, by the computer, the first feature as a minimally predictive feature if each of the prediction values is within a predetermined range of threshold values;
    wherein identifying the first feature as the minimally predictive feature enables elimination of the first feature from use during classification of information;
    wherein generating includes:
       generating a feature bit vector for individual features in the set of features;
       using a first label in a feature bit vector to identify those information sets within the information collection which contain the feature;

using a second label in the feature bit vector to identify those information sets within the information collection which do not contain the feature;
using the feature bit vectors to compute the set of prediction values; and
combining the feature bit vectors for the set of features into a bit vector matrix;
defining All_Positives as a number of first labels within a first feature bit vector for a first feature;
defining All_Negatives as a number of second labels within the first feature bit vector;
defining True_Positives as a number of rows in the bit vector matrix in which both the first feature bit vector and a second feature bit vector, for a second feature, have the first label;
defining False_Negatives as a number of rows in the bit vector matrix in which the first feature bit vector has the first label but the second feature bit vector has the second label;
defining False_Positives as a number of rows in the bit vector matrix in which the first feature bit vector has the second label but the second feature bit vector has the first label;
defining the first feature and second feature as a pair of features; and
setting a prediction value corresponding to the pair of features within a complete feature prediction matrix proportional to F(True_Positives/All_Positives)−F(False_Positives/All_negatives), wherein F( ) is an inverse cumulative distribution function of a Normal curve.

13. A computer-implemented method for information management, comprising:
receiving, by a computer, an information collection including a set of features;
generating, by the computer, a set of prediction values indicating a degree to which a first feature within the set of features predicts other features in the set;
identifying, by the computer, the first feature as a minimally predictive feature if each of the prediction values is within a predetermined range of threshold values;
wherein identifying the first feature as the minimally predictive feature enables elimination of the first feature from use during classification of information;
wherein generating includes:
generating a feature bit vector for individual features in the set of features;
using a first label in a feature bit vector to identify those information sets within the information collection which contain the feature;
using a second label in the feature bit vector to identify those information sets within the information collection which do not contain the feature;
using the feature bit vectors to compute the set of prediction values; and
combining the feature bit vectors for the set of features into a bit vector matrix;
defining All_Positives as a number of first labels within a first feature bit vector for a first feature;
defining All_Negatives as a number of second labels within the first feature bit vector;
defining True_Positives as a number of rows in the bit vector matrix in which both the first feature bit vector and a second feature bit vector, for a second feature, have the first label;
defining False_Negatives as a number of rows in the bit vector matrix in which the first feature bit vector has the first label but the second feature bit vector has the second label;
defining False_Positives as a number of rows in the bit vector matrix in which the first feature bit vector has the second label but the second feature bit vector has the first label;
defining the first feature and second feature as a pair of features; and
setting a prediction value, on one side of a diagonal in a feature prediction matrix and corresponding to the pair of features, proportional to F(True_Positives/All_Positives)−F(False_Positives/All_negatives), wherein F( ) is an inverse cumulative distribution function of a Normal curve.

14. A computer-implemented method for information management, comprising:
receiving, by a computer, an information collection including a set of features;
generating, by the computer, a set of prediction values indicating a degree to which each feature within the set of features predicts other features in the set;
identifying, by the computer, for each feature a maximum absolute value from the set of prediction values associated with that feature;
adding, by the computer, those features whose maximum absolute prediction value is below a predetermined threshold to a minimally predictive feature candidate list;
transferring, by the computer, a feature from the minimally predictive feature candidate list to a minimally predictive feature list in response to a user selection; and
eliminating, by the computer, features in the minimally predictive feature list from use in machine learning classification.

15. The method of claim 14, wherein adding those features whose maximum absolute prediction value is below the predetermined threshold to the minimally predictive feature candidate list comprises adding those features to a stopword candidate list.

16. A computer-implemented method for information management, comprising:
receiving, by a computer, an information collection including a set of features;
generating, by the computer, a feature bit vector for individual features in the set of features;
using, by the computer, a first label in a feature bit vector to identify those information sets within the information collection which contain the feature;
using, by the computer, a second label in the feature bit vector to identify those information sets within the information collection which do not contain the feature;
combining, by the computer, the feature bit vectors for the set of features into a bit vector matrix; defining All_Positives as a number of first labels within a first feature bit vector for a first feature;
defining All_Negatives as a number of second labels within the first feature bit vector;
defining True_Positives as a number of rows in the bit vector matrix in which both the first feature bit vector and a second feature bit vector, for a second feature, have the first label;
defining False_Negatives as a number of rows in the bit vector matrix in which the first feature bit vector has the first label but the second feature bit vector has the second label;

defining False_Positives as a number of rows in the bit vector matrix in which the first feature bit vector has the second label but the second feature bit vector has the first label;

defining the first feature and second feature as a pair of features;

setting a prediction value corresponding to the pair of features within a complete feature prediction matrix proportional to F(True_Positives/All_Positives)−F(False_Positives/All_negatives), wherein F( ) is an inverse cumulative distribution function of a Normal curve;

generating a set of prediction values, according to the elements list above, indicating a degree to which the first feature within the set of features predicts other features in the set; and identifying the first feature as a minimally predictive feature if an absolute value of each of the prediction values is within a predetermined threshold range, wherein identifying the first feature as the minimally predictive feature enables elimination of the first feature from use during classification of information.

17. A non-transitory computer-readable medium storing application instructions, where the instructions, when executed by a computer, effect information management, comprising:

receiving an information collection including a set of features;

generating a set of prediction values indicating a degree to which a first feature within the set of features predicts other features in the set;

identifying the first feature as a minimally predictive feature if an absolute value of each of the prediction values is below a predetermined threshold value; and eliminate the first feature from use in machine learning classification, wherein the generating includes:
generating a feature vector for each of individual features in the set of features;
using values in each feature vector to indicate a degree to which information sets within the information collection contain the respective feature; and
using the feature vectors to compute the set of prediction values.

18. The computer-readable medium of claim 17, wherein:
the set of features include words; and
the minimally predictive feature is a stopword, wherein the first feature is identified as the stopword if the absolute value of each of the predictive values is below the predetermined threshold value.

19. The computer-readable medium of claim 17, further comprising:

enumerating a set of most frequently occurring features within the information collection; and performing the generating and identifying only with respect to the set of most frequently occurring features.

20. A non-transitory computer-readable medium storing application instructions, where the instructions, when executed by a computer, effect information management, comprising:

receiving an information collection including a set of features;

generating a set of prediction values indicating a degree to which each feature within the set of features predicts other features in the set;

identifying for each feature a maximum absolute value from the set of prediction values associated with that feature;

adding those features whose maximum absolute prediction value is below a predetermined threshold to a minimally predictive feature candidate list; and transferring a feature from the minimally predictive feature candidate list to a minimally predictive feature list in response to a user selection, wherein the minimally predictive feature list identifies features are not used for classification of information.

21. The computer-readable medium of claim 20, wherein the minimally predictive feature candidate list is a list of stopwords.

22. A computer-implemented system for information management comprising:

a computer configured to:
receive an information collection including a set of features;
generate a set of prediction values indicating a degree to which a first feature within the set of features predicts other features in the set; and
identify the first feature as a stopword if each of the prediction values is within a predetermined range of threshold values;

wherein identifying the first feature as the stopword enables elimination of the first feature from use during classification of information, wherein the generating includes:
generating a feature vector for each of individual features in the set of features;
using values in each feature vector to indicate a degree to which information sets within the information collection contain the respective feature; and
using the feature vectors to compute the set of prediction values.

23. The system of claim 22, wherein the computer is configured to further:

enumerate a set of most frequently occurring features within the information collection; and effect the means for generating and means for identifying only with respect to the set of most frequently occurring features.

24. A computer-implemented system for information management, comprising:

a computer configured to:
receive an information collection including a set of features;
generate a set of prediction values indicating a degree to which each feature within the set of features predicts other features in the set;
identify for each feature a maximum absolute value from the set of prediction values associated with that feature;
add those features whose maximum absolute prediction value is below a predetermined threshold to a stopword candidate list; and
transfer a feature from the stopword candidate list to a stopword list in response to a user selection;

wherein features in the stopword list are eliminated from use in machine learning classification.

* * * * *

UNITED STATES PATENT AND TRADEMARK OFFICE
CERTIFICATE OF CORRECTION

PATENT NO.          : 7,836,059 B2                                  Page 1 of 1
APPLICATION NO.     : 10/974278
DATED               : November 16, 2010
INVENTOR(S)         : George H. Forman et al.

It is certified that error appears in the above-identified patent and that said Letters Patent is hereby corrected as shown below:

In column 11, line 30 (Approx.), in Claim 12, delete "F( )is" and insert -- F( ) is --, therefor.

In column 12, line 14, in Claim 13, delete "F( )is" and insert -- F( ) is --, therefor.

In column 13, line 10, in Claim 16, delete "F( )is" and insert -- F( ) is --, therefor.

Signed and Sealed this
Twenty-second Day of March, 2011

David J. Kappos
*Director of the United States Patent and Trademark Office*